United States Patent [19]
Baedke et al.

[11] Patent Number: 5,316,106
[45] Date of Patent: May 31, 1994

[54] LUBRICANT COOLING SYSTEM FOR A MOTOR VEHICLE AXLE

[75] Inventors: William D. Baedke, Romeo; Michael J. Alder, Oxford, both of Mich.

[73] Assignee: Ford Motor Company, Dearborn, Mich.

[21] Appl. No.: 57,929

[22] Filed: May 7, 1993

[51] Int. Cl.⁵ .............................................. F01M 9/00
[52] U.S. Cl. ............................ 184/6.12; 184/6.22; 184/11.1; 184/11.2; 184/104.3; 74/467; 74/606 A
[58] Field of Search ........................ 74/467, 606 A; 184/6.12, 6.22, 11.1, 11.2, 104.1

[56] References Cited

U.S. PATENT DOCUMENTS

| | | | |
|---|---|---|---|
| 1,247,276 | 11/1917 | Hurlburt | 184/6.12 |
| 1,639,680 | 8/1927 | Acker | |
| 1,847,611 | 3/1932 | Hodgkinson | |
| 1,950,034 | 3/1934 | Mulford et al. | |
| 2,696,074 | 12/1954 | Dolza | |
| 2,802,548 | 8/1957 | Mart et al. | 184/104.1 |
| 2,908,351 | 10/1959 | Daley, Jr. | 184/6.12 |
| 3,502,177 | 3/1970 | Christie | 184/6.12 |
| 3,690,410 | 9/1972 | Sieghartner | |
| 3,736,812 | 6/1973 | Wellauer | |
| 3,874,183 | 4/1975 | Tabet | |
| 3,884,293 | 5/1975 | Pessolano et al. | |
| 4,114,477 | 9/1978 | Iverson | |
| 4,352,301 | 10/1982 | Fleury | 184/6.12 |
| 4,393,922 | 7/1983 | Bährle et al. | |
| 4,915,192 | 4/1990 | Hayashida et al. | |

Primary Examiner—Thomas E. Denion
Attorney, Agent, or Firm—Frank G. McKenzie; Roger L. May

[57] ABSTRACT

In a driven axle assembly (12) for a motor vehicle that includes a differential housing located substantially in the center of the axle and tubes (16, 17) extending laterally from the differential, surrounding axle shafts (20) and opening into a lubricant reservoir (60) in the differential housing, a system for circulating and cooling axle lubricant includes a cover (26) for closing and sealing the housing having an aperture into the housing where a ring gear rotates through the lubricant reservoir. The aperture in the cover opens to a chamber that holds lubricant carried through the aperture by the rotating ring gear. Conduits (72, 74) connected by hydraulic fittings (76, 78) to the chamber have their opposite ends connected to the axle tubes at an outboard location distant from the differential housing. Lubricant flows through the conduits into the axle tubes and back to the housing reservoir, effectively cooling the lubricant without the addition of a pump.

6 Claims, 3 Drawing Sheets

LUBRICANT COOLING SYSTEM FOR A MOTOR VEHICLE AXLE

BACKGROUND OF THE INVENTION

1. Field of the Invention

This invention relates generally to an axle for motor vehicles in which power is transmitted from a driveshaft to axle shafts. More particularly, the invention pertains to a system for circulating and cooling hydraulic lubricant in such an axle.

2. Description of the Prior Art

Hydraulic lubricant held in a reservoir at the bottom of an axle assembly housing near the ring gear of an axle differential is heated due to friction produced at bearings in the housing and by energy transferred to the lubricant from the ring gear as it rotates in the housing through the lubricant reservoir. In addition, the lubricant is heated by radiation from vehicle exhaust systems and high ambient air temperatures.

Axle lubricants are adversely effected by high temperature. Their performance deteriorates gradually when their temperature is excessive.

Various techniques have been developed for transferring heat from an axle lubricant so that the operating temperature of the lubricant is maintained at an acceptable temperature. For example, to cool axle lubricant operating in a high torque and high temperature environment, lubricant from the axle reservoir is circulated by an hydraulic pump through an external cooler wherein heat is exchanged to ambient air and the lubricant is returned through a closed hydraulic system to the reservoir in the axle housing. U.S. Pat. No. 3,690,410 describes a system of this type. U.S. Pat. Nos. 3,884,293 and 4,393,922 describe use of heat pipes to cool lubricant in internal combustion engines and axle housings.

U.S. Pat. No. 1,950,034 describes an axle housing formed with fins used to increase its surface area and to enhance transfer of heat from the lubricant, which circulates through bearings that support the differential mechanism, to outside air. Pumping action of the differential ring gear circulates lubricant to the heat exchanger, which is formed intrically with the axle housing.

Each of the techniques in the prior art for exchanging heat from an hydraulic lubricant to the ambient requires enhanced heat transfer capability, usually in the form of a finned heat exchanger or use of an hydraulic pump, in order to increase the surface area through which heat is exchanged from lubricant to air or to circulate the lubricant at a sufficient flow rate so that an acceptable level of heat transfer occurs. A pump and finned heat transfer surfaces add cost to the system, and the pump adds to the power load. Preferably, an axle lubricant system would include means for transferring a sufficient amount of heat to ambient air without need for an external power source to drive a lubricant pump and without need to enhance heat exchange capabilities of a conventional axle housing.

SUMMARY OF THE INVENTION

It is an object of the present invention to provide a system that cools axle lubricant in an axle housing assembly by using the large surface area of axle tubes that surround axle shafts and extend outward from the differential portion of the axle housing to the vicinity of the wheels at the outboard end of the tubes. The system according to the present invention uses inherent pumping action of the ring gear rotating through a lubricant reservoir within the differential housing to move lubricant from the reservoir to a chamber located at an elevation relatively high on the differential housing. Axle lubricant flows in conduits from the cover of the rear axle housing to the outboard ends of two axle housing tubes that surround the axle shafts and extend from the differential mechanism to the wheel assemblies. The conduits are connected by hydraulic fittings to the axle tubes, along which the lubricant flows inboard and returns to the reservoir at the bottom of the differential housing. The large surface area of the tubes and the relatively high flow rate of ambient air over the outer surfaces of the tubes provides an excellent combination that allows an efficient exchange of heat from the lubricant in the axle housing to air flowing over the tubes.

The system according to the present invention requires no hydraulic pump; instead, lubricant is moved from the reservoir to the chamber in the cover by the action of the differential ring gear rotating in the housing through the lubricant located at the bottom of the housing. Because the elevation of the chamber to which the lubricant is carried by the ring gear is higher than the elevation of the fittings at the outboard end of the tubes, axle lubricant flows by the effect of gravity along the conduits from the chamber into the axle tubes.

Several advantages result from the lubricant circulation system according to this invention. The system provides a high volume, steady stream of lubricant to the wheel bearings and the adjacent seal so that their service lives are increased. It is a low cost, efficient and effective system for cooling axle lubricant. This system requires no additional pumping source nor heat exchanger.

Test results show that, in a production vehicle operating under normal operating conditions with standard axle lubricants, the temperature of the axle lubricant is reduced by 86° F. by the system of this invention. The tests further show that the temperature of a synthetic lubricant under the same operating conditions was reduced by 40° F. by this system.

DESCRIPTION OF THE PREFERRED EMBODIMENT

Figure 1:
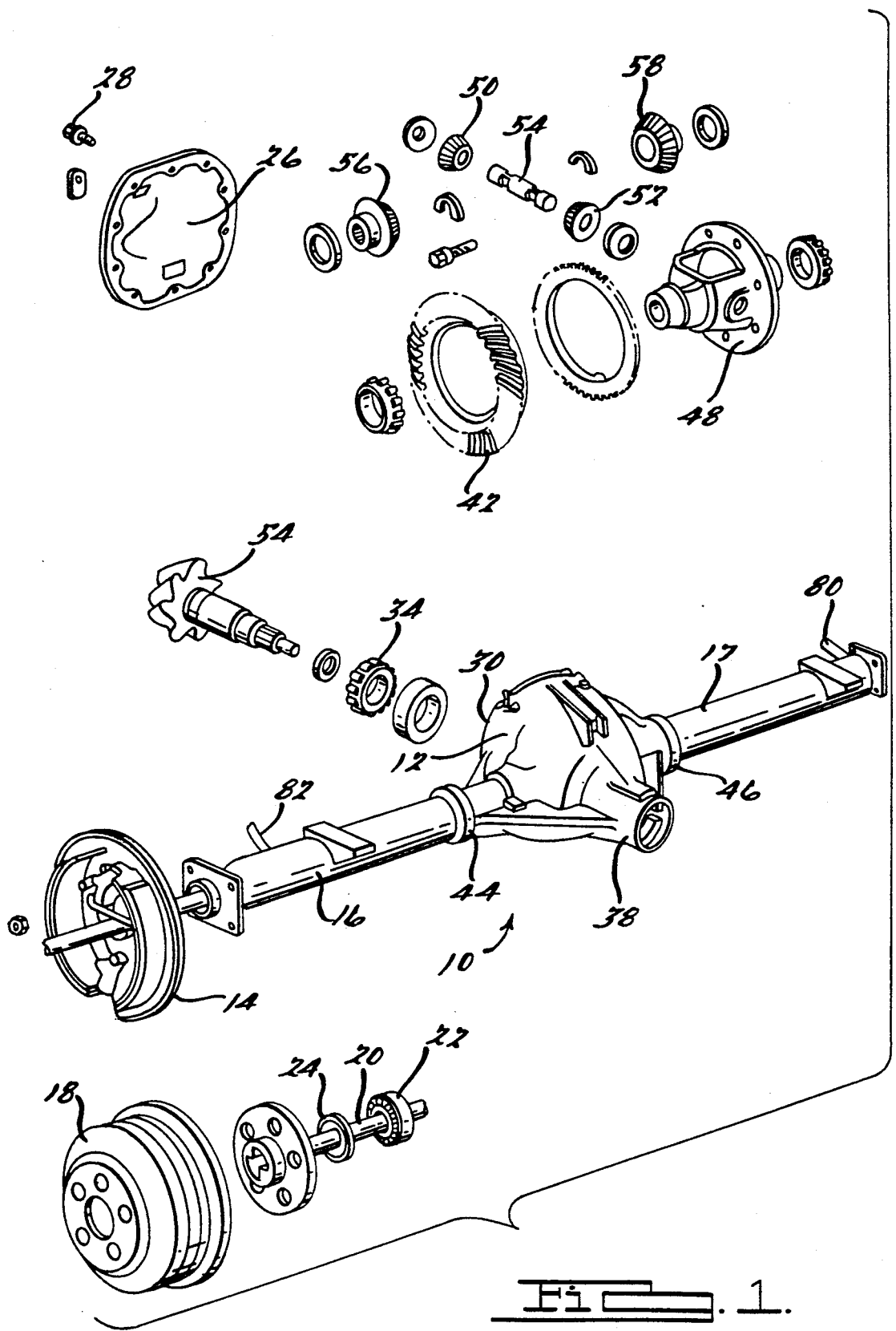
FIG. 1 is a perspective view looking rearward toward an axle assembly incorporating the present invention.

Referring first to FIG. 1, an axle assembly, to which the present invention can be applied, includes axle housing 12, which contains a differential mechanism and a reservoir of hydraulic lubricant; brake assembly 14 located at the end of a tube 16 extending outboard from the ends of the axle housing 12; brake drum 18; axle shaft assembly 20; axle shaft bearing 22; and bearing seal 24.

A cover 26 is connected by bolts 28 to the rear face 30 of the housing 12 hydraulically seals the housing against the passage of lubricant.

Figure 2:
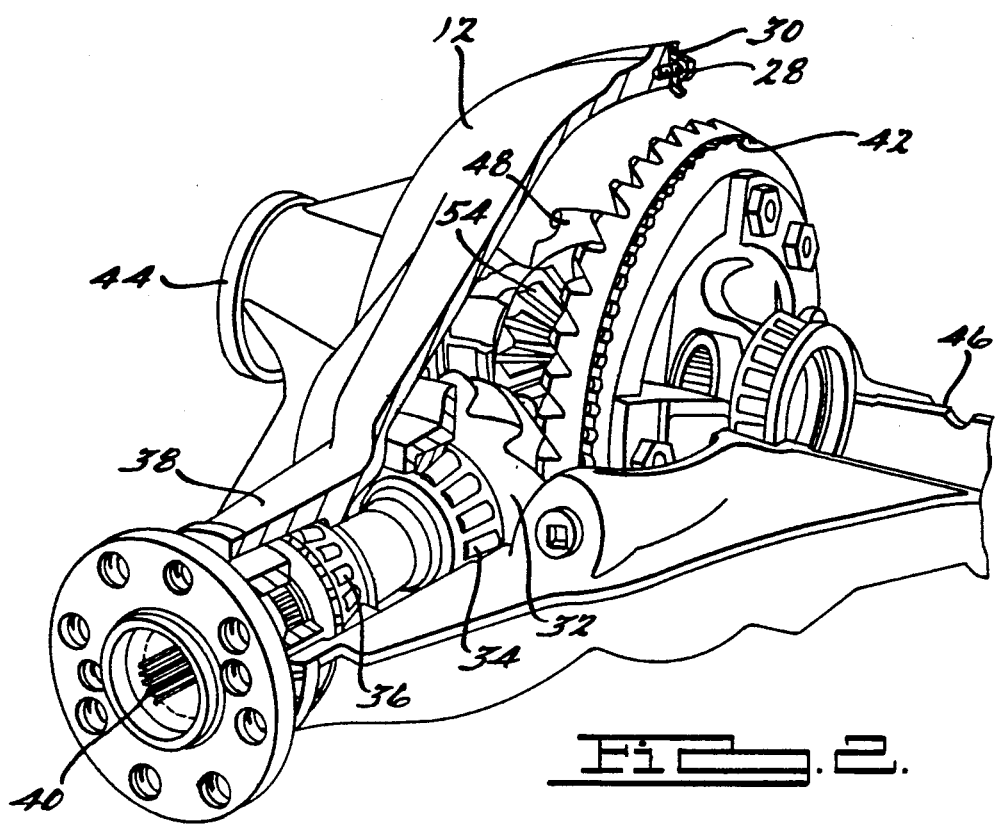
FIG. 2 is a perspective view partially in cross section taken through a plane through the driveshaft and axle assembly of FIG. 1.

Located within the differential case is a drive pinion 32, seen best in FIG. 2, rotatably supported by a rear drive pinion bearing 34 and a front drive pinion bearing 36 supported on the inner surface of a portion of the axle carrier casing 38 that extends forward from the center line of the axle assembly. A driveshaft, driveably connected to the output shaft of a transmission, is connected through spline 40 to the shaft that drive pinion 32.

The differential mechanism, located within the differential case, includes a ring gear 42, in continuous meshing engagement with drive pinion 32 and supported rotatably on differential front drive pinion bearing 34 and rear drive pinion bearing 36 located within the housing gear and cylindrical extension 38 of the housing assembly 12.

The axle carrier assembly 12 also includes laterally directed tubular extensions 44, 46, which receive therein the ends of housing tubes 16 and 17, respectively. Located within the axle assembly 12 is a differential carrier 48, on which bevel pinion gears 50, 52 are supported for rotation on a differential pinion shaft 54. Side bevel gears 56, 58 are in continuous meshing engagement with pinions 50, 52 and are driveably connected to left and right axle shafts 20, located respectively within tubes 16 and 17.

Figure 3:
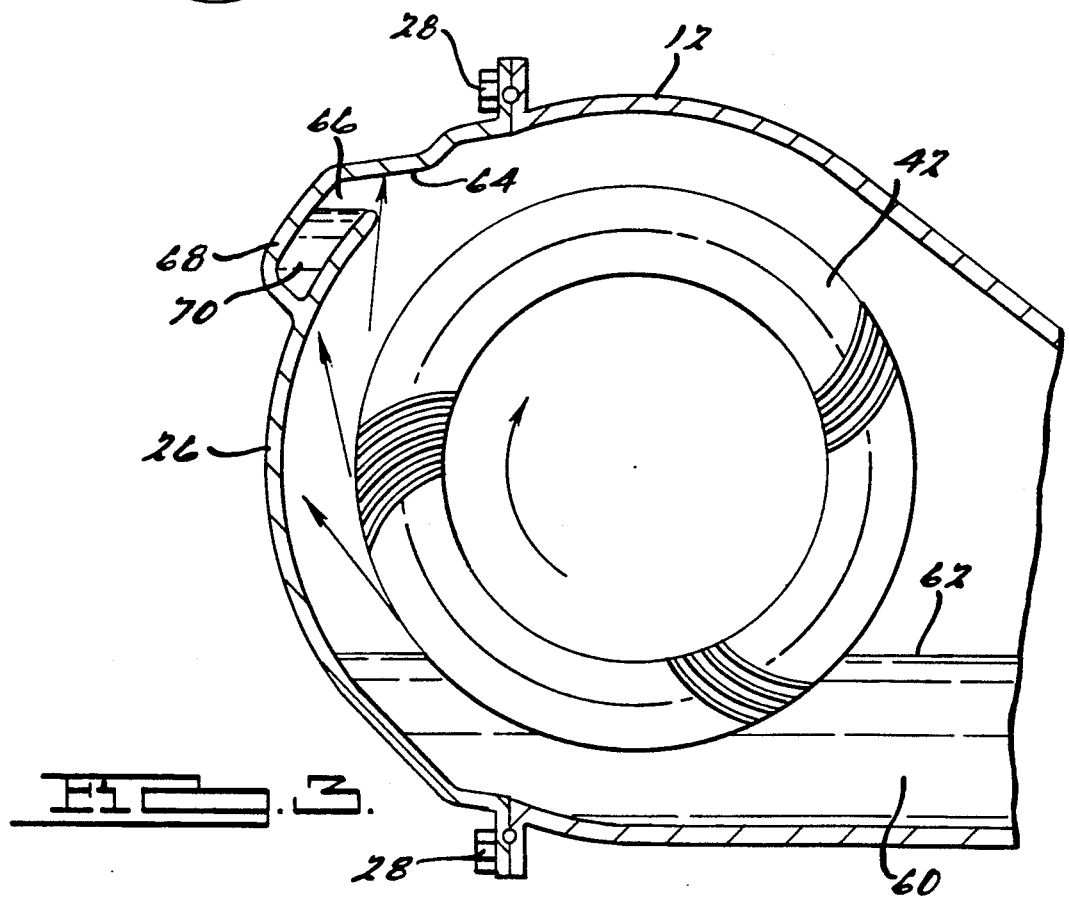
FIG. 3 is a cross section taken at a longitudinal plane through the center of the axle differential of FIG. 2.

FIG. 3 shows ring gear 42, supported rotatably in the axle assembly housing 12, and cover 26, which closes the axle housing. The space enclosed by cover 26 and housing 12 contains a reservoir of hydraulic lubricant 60, whose upper lever 62 is high enough so that ring gear 42 rotates partially in the lubricant. The ring gear rotates clockwise as seen in FIG. 3 partially through the space within the axle assembly that is occupied by the lubricant and partially within the space above the lubricant.

Figure 4:
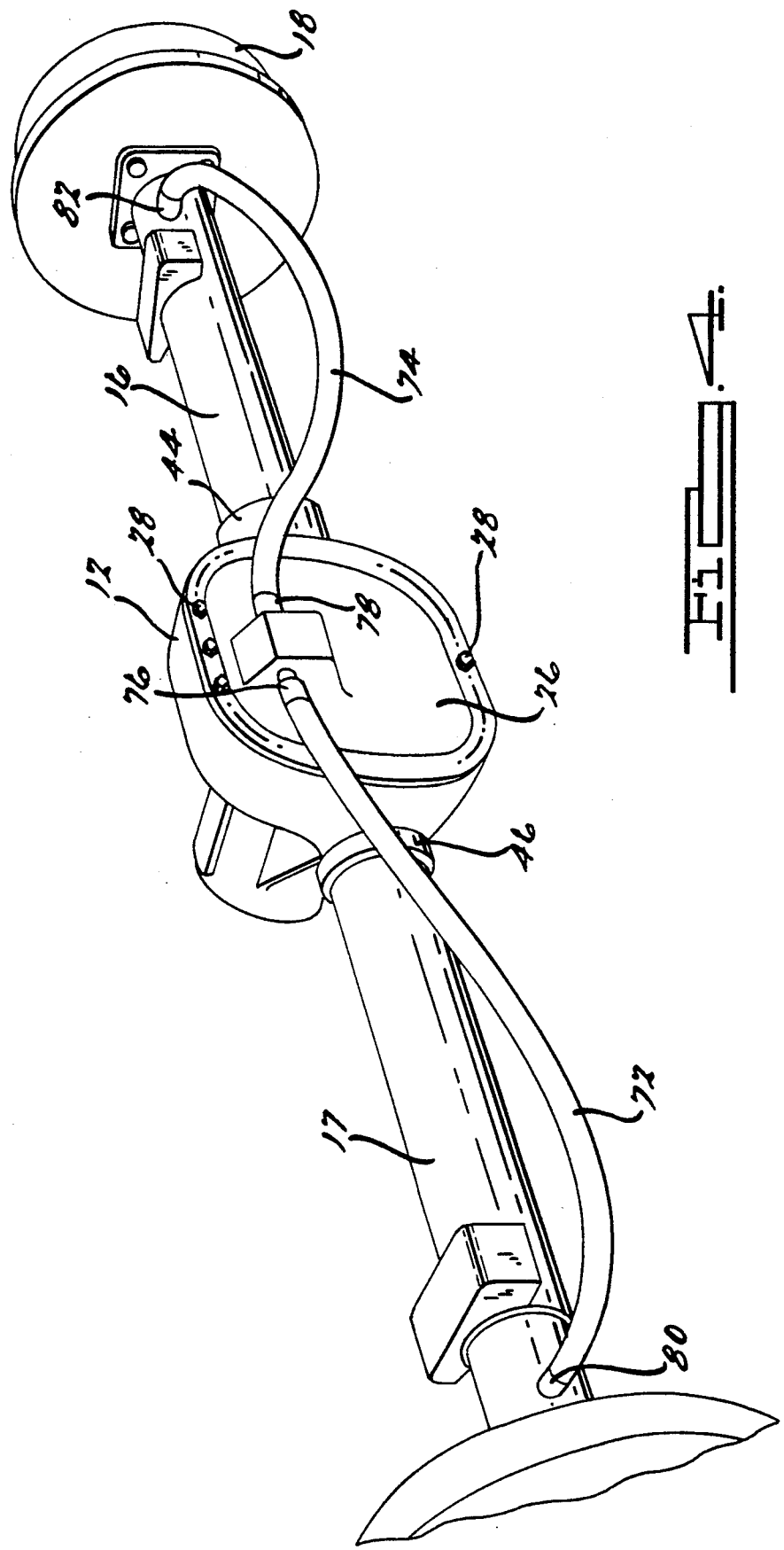
FIG. 4 is a perspective view looking forward toward an axle assembly incorporating the present invention.

Cover 26 includes an aperture 64 that opens the housing interior into a chamber 66 adapted to hold lubricant 70 that passes through the aperture from the interior of the axle housing. Chamber 66 is bounded by an outer wall 68 and inner wall formed integrally with other portions of cover 26. As ring gear 42 rotates the beveled teeth of the gear, or slingers (such as those shown in FIGS. 3 and 4 of U.S. Pat. No. 1,950,034) fixed to the lateral surface of the gear, carry lubricant from the reservoir 60 and throw it against the inner surface of cover 26 above aperture 64, through which it passes into chamber 66.

Mounted at the transverse side of chamber 60 are two conduits 72, 74 extending substantially in the direction of the right-hand axle shaft 20 and the left-hand axle shaft, respectively. The conduits 72, 74 comprise tubes connected by a conventional fittings 76, 78 located at the lateral surfaces of chamber 66 and by fittings 80, 82 that extend substantially rearward from the outer surface of axle tubes 16, 17, respectively. The elevation of fitting 76 on chamber 66 is above the elevation of fitting 80, and the elevation of fitting 78 is above the elevation of fitting 82. Therefore, lubricant flows by gravity from chamber 66 through conduits 72, 74 into axle tubes 16 and 17 without a pump or other pressure source. Fittings 80 and 82 are located near the outer end of the axle tubes 16, 17 adjacent the bearings 22 that rotatably support the axle shafts. Lubricant enters the axle tubes through the fittings, flows inboard along the tubes through the cylindrical extensions 44, 46 of the axle housing, and returns to the housing reservoir.

As the vehicle moves, a substantial high speed airstream passes over the external surfaces of the axle tubes 16, 17. Heat passes through the walls of the tubes to the airstream, thereby producing a substantial reduction in temperature of the lubricant in comparison to the temperature of the lubricant in an identical system that provides no circulation of lubricant through conduits and axle tubes.

Tests of the system according to the present invention demonstrated in a production vehicle that conventional lubricant temperature was reduced 86° F. (from 315° to 229°). When synthetic lubricant was used in an identical production vehicle, tests showed that its temperature was reduced to 40° F. (from 250° to 201°).

The present invention operates to substantially reduce the operating temperature of lubricant in a drive axle of an automotive vehicle by effectively circulating lubricant without the use of an external fluid power source pump. Lubricant is carried to portions of the axle assembly that are exposed to a high velocity airstream so that heat in the lubricant is transferred to the airstream without need to provide additional heat transfer surfaces such as fins.

We claim:

1. A system for circulating lubricant in an assembly, comprising:

a housing adapted to contain a reservoir of hydraulic lubricant, having a tubular portion extending outward from the reservoir, the tubular portion hydraulically communicating with the reservoir;

an aperture in the housing to permit lubricant circulation;

a chamber located adjacent the aperture, adapted to hold lubricant therein, the chamber located at a first elevation;

a component supported for rotation partially in the lubricant and partially in a portion of the housing located above the lubricant, having means for moving lubricant from the reservoir to the chamber; and conduit means having a first end hydraulically connected to the chamber and a second end hydraulically connected to said tubular portion of the housing at a location that is distant from the reservoir and at a second elevation lower than the first elevation, for carrying lubricant from the chamber to the tubular portion of the housing, using gravity to transport lubricant from the first elevation to the second elevation.

2. The system of claim 1 wherein:

the housing includes first and second tubular portions extending outward in opposite directions from the reservoir; and the conduit means includes first and second conduits, the first conduit having a first end connected to the chamber and a second end hydraulically connected to said first tubular portion of the housing, the second conduit having a first end connected to the chamber and a second end hydraulically connected to said second tubular portion of the housing, the second ends on the first and second conduits being located distant from the reservoir and at a second elevation lower than the first elevation.

3. A system for circulating lubricant in an axle of a motor vehicle, comprising:

a housing adapted to contain a reservoir of hydraulic lubricant, having a tubular portion extending outward from the reservoir, the tubular portion hydraulically communicating with the reservoir;

an aperture in the housing to permit lubricant circulation;

a chamber located adjacent the aperture, adapted to hold lubricant therein, the chamber located at a first elevation;

an axle differential mechanism including a ring gear supported for rotation partially in the lubricant reservoir and partially in a portion of the housing located above the lubricant reservoir, said ring gear moving lubricant from the reservoir to the chamber as it rotates within the housing;

an axleshaft driveably connected to the differential mechanism, extending along the tubular portion of the housing, rotatably supported on a bearing in the tubular portion; and conduit means having a first end hydraulically connected to the chamber and a second end hydraulically connected to said tubular portion of the housing at a location that is distant from the reservoir and at a second elevation lower than the first elevation, for carrying lubricant from the chamber to the tubular portion of the housing, using gravity to transport lubricant from the first elevation to the second elevation.

4. The system of claim 3 wherein the second end of the conduit is located on the tubular portion of the housing adjacent the bearing.

5. The system of claim 3 wherein:

the housing includes first and second tubular portions extending outward in opposite directions from the reservoir and hydraulically communicating with the reservoir;

the conduit means includes first and second conduits, the first conduit having a first end hydraulically connected to the chamber and a second end hydraulically connected to said first tubular portion, the second conduit having a first end hydraulically connected to the chamber and a second end hydraulically connected to said second tubular portion, the second ends on the first and second conduits being located distant from the reservoir and at a second elevation lower than the first elevation, further comprising:

first and second axleshafts driveably connected to the differential mechanism, the first axleshaft extending along the first tubular portion and rotatably supported on a first bearing in the first tubular portion, the second axleshaft extending along the second tubular portion and rotatably supported on a second bearing in the second tubular portion.

6. The system of claim 5 wherein the second end of the first conduit is located on the first tubular portion adjacent the first bearing and the second end of the second conduit is located on the second tubular portion adjacent the second bearing.

* * * * *